Sept. 27, 1966     F. J. SHONEBARGER     3,275,358
GLASS-TO-METAL AND GLASS-TO-CERAMIC SEALS
Filed March 14, 1963
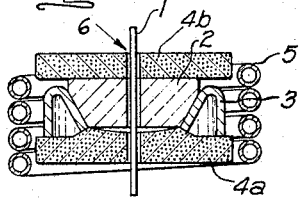
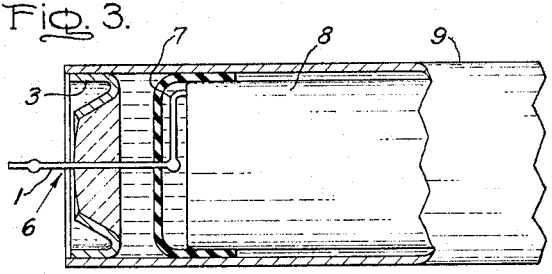
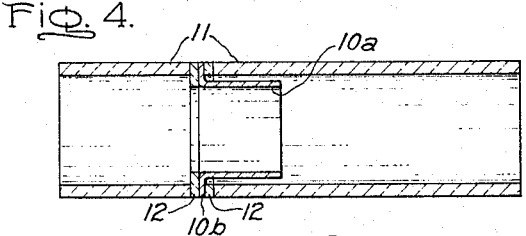
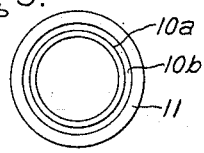
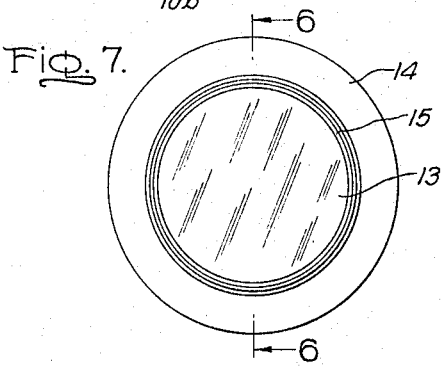
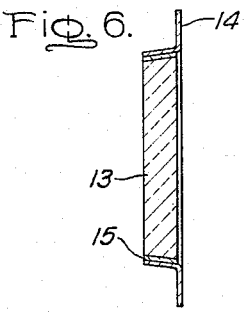
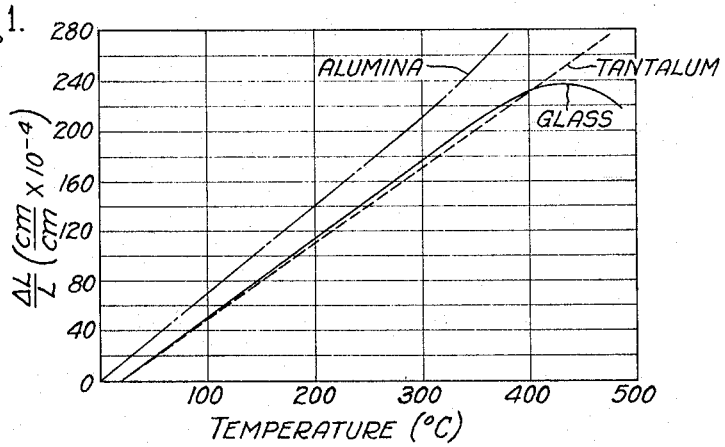
Inventor:
Francis J. Shonebarger
by Otto Tichy
His Attorney

United States Patent Office 3,275,358
Patented Sept. 27, 1966

3,275,358
GLASS-TO-METAL AND GLASS-TO-CERAMIC SEALS
Francis J. Shonebarger, Lancaster, Ohio, assignor to General Electric Company, a corporation of New York
Filed Mar. 14, 1963, Ser. No. 265,235
9 Claims. (Cl. 287—189.365)

The present invention relates to glass compositions and glass-to-metal and glass-to-ceramic fused hermetic seals.

In the construction of electrical capacitors and other electrical devices, tantalum and other film-forming metals, i.e., metals forming dense, adherent dielectric oxide surface films, are useful as electrode materials. However, as far as applicant is aware, no satisfactory glass hermetic seals to tantalum current lead wires for tantalum capacitors have been available before the present invention. For reliability, particularly under high vacuum conditions, hermetic seals are desirable for tantalum capacitors in order to prevent loss of electrolyte.

Glass-to-ceramic seals are useful in the arts generally. For example, glasses capable of making a fused hermetic seal with polycrystalline sintered alumina bodies are useful in the construction of electronic tubes and laboratory equipment. The polycrystalline sintered alumina can be either the conventional type or in the form of a transparent body such as that described in U.S. Patent 3,026,210, Coble, assigned to the same assignee as the present invention. Also, glasses capable of sealing sapphire to metal are useful for providing chamber windows for the transmission of electromagnetic radiations.

The principal object of the present invention is to provide glass compositions capable of sealing directly to tantalum, the mean coefficient of thermal expansion of which in the temperature range of 20° C. to 500° C. is about $66 \times 10^{-7}$ cm./cm./° C., and to polycrystalline sintered alumina, the mean coefficient of thermal expansion of which in the temperature range of 20° C. to 500° C. is about 70 cm./cm./° C. to make fused hermetic seals.

Another object of the invention is to provide glass which anneals at about 550° C. and is capable of flowing make a seal at temperatures between 850° C. and 1100° C., and which has a thermal expansion coefficient suitable for sealing directly to tantalum and to alumina ceramics.

A further object of the invention is to provide a fused hermetic seal including glass and current lead wires of tantalum or other similar metals useful in capacitors and other electrical or non-electrical devices.

Another object of the invention is to provide a fused hermetic seal including glass and alumina ceramic, such as sapphire and polycrystalline sintered alumina.

In order to form a satisfactory seal with tantalum, the expansion coefficient of the glass should not be appreciably higher than that of tantalum and should not differ from that of tantalum by substantially more than $\pm 10 \times 10^{-7}$ cm./cm./° C., at the annealing temperature of the glass. Similar considerations apply to seals to alumina. Glasses in accordance with the invention will, in general, seal satisfactorily to other metals and alloys and to other ceramics having thermal expansion characteristics similar to that of tantalum.

According to one aspect of the invention, a glass suitable for sealing to tantalum or other metal or alloy or a ceramic of similar thermal expansion characteristics is provided, having a composition, by weight, or about 40% $B_2O_3$, 25% $Al_2O_3$, and 35% BaO. All proportions referred to in this specification and in the appended claims are by weight.

According to another aspect of the invention, a glass-to-metal seal is provided consisting of a metal body of tantalum or other metal or alloy of similar thermal expansion characteristics, sealed to a glass having a composition approximating that specified in the preceding paragraph.

According to still another aspect of the invention, a glass is provided which is suitable for sealing to ceramics, particularly alumina ceramics, and for sealing such ceramics to other ceramics or metal bodies.

Briefly stated, the present invention provides a glass suitable for sealing to tantalum and to other metals, alloys and ceramics having similar thermal expansion characteristics and having a composition of about 40% $B_2O_3$, 25% $Al_2O_3$, and 35% BaO. Seals can be made between this glass and other suitable materials for use in electrical devices such as capacitors, in laboratory equipment, and in other applications.

While a specific composition is herein described, it will be obvious to ceramists experienced in the art that slight modifications of percentages can be made without departing from the scope of the invention.

In the drawing accompanying and forming part of this specification:

FIG. 1 is a graphic representation of linear thermal expansion plotted against temperature for tantalum, polycrystalline sintered alumina and a glass of the present invention.

FIG. 2 is a sectional view of parts assembled in a fixture for the making of a glass-to-metal seal of the present invention.

FIG. 3 is a partial sectional view of a tantalum capacitor provided with a glass-to-metal seal of the present invention.

FIGS. 4 and 5 are, respectively, sectional and end views of a seal between a metal and a ceramic made with a glass of the present invention.

FIGS. 6 and 7 are, respectively, sectional and end views of a seal between sapphire and a metal made with a glass of the present invention.

The glasses of this invention require particular care during founding because of the large difference in melting temperature of the glass constituents. BaO and $B_2O_3$ form a low melting eutectic which reacts slowly with alumina to form a homogeneous glass. Partly for this reason, and partly for the reason that the constituents are reactive with conventional furnace lining ceramics such as zircon, the glasses of this invention are melted in platinum crucibles.

A batch suitable for forming the glass contains, in parts by weight, 45.1 parts barium carbonate, $BaCO_3$, 38.3 parts aluminum hydrate, $Al(OH)_3$ and 71.1 parts boric acid, $H_3BO_3$. Batches of this composition have been held at about 1425° C. for 2.5 to 3 hours in an electric furnace under an air atmosphere to produce completely melted 100 gram lots of homogeneous glass. The time necessary for complete melting can be determined by inspecting the melt. As determined by inspection, the melting is complete when all crystals of $Al_2O_3$ have disappeared and the melt appears to be a clear liquid. The time required may vary with humidity and other extraneous factors. After founding, the glass is poured onto a relatively cold metal plate for chilling.

The batch melted as described above produced a glass containing approximately 40% $B_2O_3$, 25% $Al_2O_3$, and 35% BaO, as calculated from the batch.

The glass has a mean thermal expansion coefficient in the temperature range of 0° C. to 300° C. of about $60 \times 10^{-7}$ cm./cm./°C., a strain point of 510° C., annealing point of 545° C. and a softening point of 680° C. FIG. 1 shows curves representing the linear expansion of the glass, tantalum metal and polycrystalline, sintered alumina over a range of temperatures.

To make a useful seal, the glass preferably is made into preforms by the procedure described below; however, other procedures well known in the art likewise be useful to produce suitable preforms of the glass.

The cooled glass is mechanically crushed and ball-milled to a fine powder of generally −100 sieve size. Sieve sizes in this specification are given in the United States Standard Series. This powder is mixed with a binder material comprising butyl methacrylate, such as Acryloid F–10, diluted with trichlorethane and including as a lubricant, Sterotex, a powdered vegetable stearine. The binder is added to the glass powder in an amount equivalent to about 4% butyl methacrylate solids and the resulting mixture is put through a 10-mesh screen and spread out for evaporation. The dried glass is then crushed through a 50-mesh screen. Pellets in the shape of annular preforms are pressed on a conventional pellet-pressing machine with 10,000 to 30,000 p.s.i. pressure on the dies, and heated in a lehr at 400° C. for about 18 minutes to volatilize the binder and then for about 26 minutes at 660° C. to sinter the glass into a coherent pellet.

Although this particular binder system is not the only one useable, it is necessary that the binder sublime or volatilize on heating and leave no harmful amount of residue in the sintered glass pellets.

As shown in FIG. 1, the linear thermal expansion characteristics of glass of the present invention are closely similar to those of tantalum metal and polycrystalline sintered alumina.

In forming a glass-to-metal seal, it has been found that this glass will seal around a tantalum wire whether the tantalum metal has been anodically oxidized or has a relatively clean metallic surface. In the latter case, it appears that an adherent tantalum oxide is formed on the metal surface by reaction with the glass at the seal-forming temperature, and that this oxide is wet by the molten glass. However, it is preferred to use pre-oxidized tantalum in making a seal.

Other metals to which the glass seals successfully include niobium and an alloy of 46% nickel in iron. Niobium has a mean coefficient of thermal expansion of about $73.9 \times 10^{-7}$ cm./cm./° C. in the temperature range of 0° C. to 600° C.; 46% Ni-Fe has a coefficient of thermal expansion of about $76 \times 10^{-7}$ cm./cm./° C. in the temperature range of 20° to 465° C. A metal or ceramic to be sealed to the glass should not have a phase change in the temperature range of 20° C. to 500° C. causing a large change in thermal expansion characteristics.

The glass will form a good galss-to-metal seal with metals which have been coefficients of thermal expansion in the temperature range of 20° C. to 500° C. within about $\pm 10 \times 10^{-7}$ cm./cm./° C. of that of tantalum over the same temperature range which is about $66 \times 10^{-7}$ cm./cm./° C. The temperature range is chosen as being the range between the lowest normal use temperature and the temperature at which the glass sets on cooling. Below 500° C., strains in the glass are relatively permanent; above this temperature, strains can be annealed out and do not greatly affect the strength or reliability of the seal.

Referring now to FIG. 2, satisfactory seals including a tantalum current lead wire 1, a glass preform 2, and a titanium header 3 have been made by the following procedure.

The three aforementioned parts are positioned on a graphite pedestal 4a with the tantalum wire 1 extending through the preform 2 and the preform resting concentrically in the tantanium header. A graphite cap 4b covers the top of the glass. The header and, to a certain extent, the graphite pedestal 4a and cap 4b are heated by a high-frequency electronically powered induction coil 5 in an atmosphere of flowing argon to a temperature of about 950° C. for 30 seconds. The temperature then is raised to 1000° C. for 60 seconds and then to 1075° C. for 90 seconds. The glass-to-metal seal assembly then is cooled to room temperature in a continuing flow of argon gas. The cooling rate is not critical.

Alternatively, the glass-to-metal seal assembly 6 shown in FIGS. 2 and 3 can be formed by heating the assembly 6 under a vacuum of less than $10^{-4}$ mm. Hg. pressure to 650° C. for about fifteen minutes, raising the temperature to 875° C. for 10 minutes in an argon atmosphere at 3 to 5 p.s.i.g. pressure, and then cooling in the same atmosphere. The vacuum treatment serves to throughly outgas the system before it is raised to sealing temperature.

The glass-to-metal seal assembly described above can be incorporated into an electrical device as shown in FIG. 3 by welding the tantalum wire 1 to a lead strap 7 connected to a tantalum foil capacitor roll 8, sliding the capacitor and seal assembly 6 into a metal outer sleeve 9, and then circumferentially welding the titanium header 3 to the outer sleeve. A similar seal can be used on the other end of the capacitor. When both headers are welded to the outer sleeve 9, hermetic seals will have been formed.

More detailed examples of glass-to-metal seals using the glass of the present invention in capacitors may be found in co-pending application Serial No. 265,163, Merritt et al., filed on the same date and assigned to the same assignee as the present application.

As will be obvious to those skilled in the art, a similar seal can be used for many types of electrical devices as well as for devices which are not electrical in character.

As pointed out by the 1949 book "Glass-to-Metal Seals," by J. H. Partridge, published by the Society of Glass Technology, Sheffield, England, most ceramic substances possess nearly uniform thermal expansion characteristics from room temperature up to temperatures exceeding the upper annealing temperatures of glasses. For this reason, the principles applied to matched glass-to-metal seals can often be applied to making of glass-to-ceramic seals. Thus, it is necessary to match the thermal expansion coefficient of the glass with that of the ceramic over the temperature range involved.

The glass of the present invention is useful for sealing polycrystalline sintered alumina to flanged cups of niobium or other suitable metals, as shown in FIGS. 4 and 5. The metal cup is represented at 10a, its flange at 10b, the alumina at 11 and the glass of the present invention at 12.

FIGS. 6 and 7 show a sapphire window 13 sealed into a Kovar metal ring 14 by the glass 15 of the invention. Kovar is an alloy of 29% nickel, 17% cobalt, 0.3% manganese, balance iron. Sapphire, a single crystal form of alumina, is particularly difficult to seal to because of its thermal expansion characteristics. It has two different coefficients of thermal expansion in two different crystal directions, one being about $57 \times 10^{-7}$ cm./cm./° C. and the other $75 \times 10^{-7}$ cm./cm./° C. The glass of the present invention is particularly suited to sealing to sapphire because its coefficient of thermal expansion is between the two coefficients of sapphire and closer to the lower one.

These glass-to-ceramic seals can be made in essentially the same manner as used for the tantalum wire-to-glass-to-titanium header seal explained above, although slightly longer times may be necessary to achieve optimum bonding.

The particular features and principles outlining the invention described in connection with the specific examples will suggest to those skilled in the art various modifications thereof, especially, in the art of making a glass-to-metal or glass-to-ceramic seal and in formulating glass compositions with minor changes in percentages.

What I claim as new and desire to secure by Letters Patent of the United States is:

1. A glass for sealing to tantalum and to other metals, alloys, and ceramics having thermal expansion characteristics such that the mean coefficients of thermal expansion over the temperature range of 20° C. to 500° C. do not differ from that of tantalum over the same temperature range by more than about $10 \times 10^{-7}$ cm./cm./° C., which has a composition, by weight, of about 40% $B_2O_3$, about 25% $Al_2O_3$ and about 35% BaO.

2. A vacuum-tight seal between tantalum and glass as set forth in claim 1.

3. A vacuum-tight seal between glass as set forth in claim 1 and a metallic body of thermal expansion characteristics such that the mean coefficient of thermal expansion over the temperature range of 20° C. to 500° C. does not differ from that of tantalum over the same temperature range by more than about $10 \times 10^{-7}$ cm./cm./° C.

4. A vacuum-tight seal between polycrystalline sintered alumina and glass as set forth in claim 1.

5. A vacuum-tight seal between glass as set forth in claim 1 and sapphire.

6. A vacuum-tight seal between glass as set forth in claim 1 and a ceramic body of thermal expansion characteristics such that the mean coefficient of thermal expansion over the temperature range of 20° C. to 500° C. does not differ from that of tantalum over the same temperature range by more than about $10 \times 10^{-7}$ cm./cm./° C.

7. A glass-to-metal hermetic seal for electrical devices comprising a surface oxidized tantalum current lead wire and a glass body fusion sealed around said wire, said glass being composed of about 40% $B_2O_3$, about 25% $Al_2O_3$ and about 35% BaO by weight and having a mean coefficient of thermal expansion of about $60 \times 10^{-7}$ cm./cm./° C. in the temperature range of about 0° C. to 300° C.

8. A hermetic seal body comprising a metal wall having an opening therethrough, a sapphire window in said opening and a glass body filling the space between and fusion sealed to said wall and said window, said glass body being composed of about 40% $B_2O_3$, about 25% $Al_2O_3$ and about 35% BaO by weight and having a mean coefficient of thermal expansion of about $60 \times 10^{-7}$ cm./cm./° C. in the temperature range of about 0° C. to 300° C.

9. A hermetic seal body comprising a sintered alumina ceramic tube, a flanged metal member adjacent the edge of an end of said tube, and a seal glass filling the space between and fusion sealed to the end edge of said tube and said flanged metal member, said glass being composed of about 40% $B_2O_3$, about 25% $Al_2O_3$ and about 35% BaO by weight and having a mean coefficient of thermal expansion of about $60 \times 10^{-7}$ cm./cm./° C. in the temperature range of about 0° C. to 300° C.

References Cited by the Examiner

UNITED STATES PATENTS 2,899,584  8/1959  Verwey _____ 106—47 X
3,036,675  5/1962  Benichou _____ 287—189.365

OTHER REFERENCES

Hirayama et al.: "Properties of Aluminoborate Glasses of Group II Metal Oxides," J. Amer. Cer. Soc., December 1961, pp. 602–606.

TOBIAS E. LEVOW, *Primary Examiner.*

H. McCARTHY, *Assistant Examiner.*